(12) United States Patent
Truax et al.

(10) Patent No.: US 11,723,350 B2
(45) Date of Patent: Aug. 15, 2023

(54) LINE COLLECTION CONTAINER, SYSTEM AND METHOD

(71) Applicants: Eric Truax, Sammamish, WA (US); Richard Darren Ludwigsen, Sammamish, WA (US)

(72) Inventors: Eric Truax, Sammamish, WA (US); Richard Darren Ludwigsen, Sammamish, WA (US)

( * ) Notice: Subject to any disclaimer, the term of this patent is extended or adjusted under 35 U.S.C. 154(b) by 197 days.

(21) Appl. No.: 17/221,185

(22) Filed: Apr. 2, 2021

(65) Prior Publication Data
US 2022/0312750 A1    Oct. 6, 2022

(51) Int. Cl.
*A01K 69/06*    (2006.01)
*B63B 22/04*    (2006.01)
*B65H 75/36*    (2006.01)

(52) U.S. Cl.
CPC .............. *A01K 69/06* (2013.01); *B63B 22/04* (2013.01); *B65H 75/364* (2013.01)

(58) Field of Classification Search
CPC ......... B63B 21/00; B63B 22/00; B63B 22/04; A01K 69/06; A01K 73/06; A01K 73/12; B65H 75/362; B65H 75/364; B66D 3/26; Y02A 40/81
See application file for complete search history.

(56) References Cited

U.S. PATENT DOCUMENTS 2,156,831 A * 5/1939 Andre .................. A63B 69/305
                                                            383/22
3,750,970 A   8/1973 Tremoulet, Jr.
3,765,614 A * 10/1973 Bartl ...................... A01K 73/06
                                                            242/387
3,917,229 A   11/1975 Ayme
4,165,830 A   8/1979 Svendsen
(Continued)

FOREIGN PATENT DOCUMENTS

CZ    2019308 A3 * 9/2020

OTHER PUBLICATIONS

Fitdom Heavy Duty XL Soccer Mesh Equipment Bag—(Amazon.com) Accessed Jul. 6, 2020.

*Primary Examiner* — Ajay Vasudeva

(57) ABSTRACT

A portable basket is used to collect multiple weighted lines that extend between a buoy and a submerged crab pot. The basket is a cylindrical structure with flexible sidewalls that extend from a top edge to a bottom panel. Attached to the inside surface of the basket near the top edge are at least two ring connectors. During use, the basket is positioned below a winch system to pull the weighted line and the crab pot out of the water. The weighted line's first connector is detached from the buoy and connected to a ring connector inside the basket. The winch is then activated to allow the weighted line to fall into the basket and get automatically stacked in a vertical coil configuration inside the basket. When the crab pot is lifted out of the water, the second connector is detached from the crab pot and attached to the second ring connector near the top edge. The process may be repeated to collect additional weighted lines. When setting a crab pot, the buoy and pot connectors from one weighted line are detached from the ring connector and attached to desired buoy and pot, respectively. The buoy, the pot, and the coiled weighted line can then be deposited into the water.

2 Claims, 6 Drawing Sheets

(56) References Cited

U.S. PATENT DOCUMENTS

| | | | |
|---|---|---|---|
| 4,354,667 A | 10/1982 | Svendsen | |
| 7,160,028 B1 * | 1/2007 | Linday | A45C 9/00 |
| | | | 150/108 |
| 7,690,544 B2 | 4/2010 | Zaruba | |
| 9,586,119 B2 * | 3/2017 | Fu | A63B 21/4035 |

* cited by examiner

LINE COLLECTION CONTAINER, SYSTEM AND METHOD

COPYRIGHT NOTICE

Notice is given that the following patent document contains original material subject to copyright protection. The copyright owner has no objection to the facsimile or digital download reproduction of all or part of the patent document but otherwise reserves all copyrights.

BACKGROUND OF THE INVENTION

1. Field of the Invention

This invention relates to containers used to receive a line that is continuously fed into the container and automatically wound in a compact, vertically stacked coil configuration with its opposite ends held in a fixed exposed location inside the container.

2. Description of the Related Art

Crab pots are cage-like structures disposed horizontally on the seabed and used to capture large crabs. Crab pots are attached to a weighted line that extends downward from a floating buoy that marks the location of the crab pot.

When setting a crab pot, one end of the weighted line is manually attached to the buoy and the other end is manually attached to the crab pot or a crab line attached to the pot. The buoy, the weighted line and the crab pot are then tossed into the water in a 'last in' and 'first out' manner while ensuring that the weighted line does not become tangled around the buoy or the crab pot.

Recreational crabbers and small crabbing companies usually set dozens of crab pots at a time which are normally left in the water for 6 to 36 hrs. To harvest each crab pot, the crabbers return to the spot where the buoys are located and begin to retrieve the buoy one at a time from the water. After grasping the buoy, the crabber then grasps the weighted line and then disconnects it from the buoy. The crabber then extends the weighted line around pulleys used in a winch system attached to a davit mounted on the side of the boat. When the winch a motor is activated, the weighted line is pulled upward and deposited into the boat.

Eventually, the crab pot is lifted out of the water and above the gunwale. The davit is rotated so that the crab pot may be deposited into a designated landing area on the boat. The end of the weighted line is then disconnected from the crab pot or the crab line attached to the crab pot. This process is repeated for each crab pot.

Because the weighted lines are disposed on the deck of the boat adjacent to the davit, the weighted lines become tangled together, and the ends of each weighted line are difficult to identify. Later, when the crab pots are reset, the crabber must identify the top-weighted line in the pile of weighted lines and grab and connect the opposite ends of the weighted line to the buoy and crab pot.

What is needed is a storage container configured to receive one end of multiple weighted lines which causes each weighted line to automatically wind into a vertical stacked, relatively tight coil inside the container and also holds the opposite ends of each weighted line in a fixed accessible location inside the container.

SUMMARY OF THE INVENTION

A container for collecting weighted lines that exit from a continuous winch system attached to a davit that retrieves the weighted line from the water. The container is designed to conform the collected weighted line into a compacted, stacked, coil configuration and also holds the ends of the weighted line in a fixed accessible location. One example of a weighted line is the leaded, weighted line used between a buoy and a crab pot as shown in FIG. 1.

The container is a bag or elongated basket with a reinforced top edge forming a top opening into the basket. The basket is an elongated, cylindrical structure with flexible sidewalls that extend downward from the top edge to a bottom panel. Attached to the inside surface of the basket near the top edge are at least two ring connectors.

The container is designed to store multiple weighted lines with loops or manual connectors attached to its opposite ends. During use, one end of each weighted line is attached to the connector located near the top edge of the container. As the weighted line is continuously fed into the container, the weighted line is wound into a stacked loop. The container's round, flexible sidewalls are sufficiently pliable yet resistant so that the weighted line bends continuously to form a continuous loop.

During use, a crab pot attached to the opposite end of the weighted line is disconnected from the crab pot or the crab pot line attached to a crab pot. When the crab pot is positioned over a desired landing area on the boat, the winch system is discontinued and the pot connector attached to the weighted line is either attached to the same ring connector or to nearby ring connector located near the top edge of the container.

The above process may then be repeated with additional weighted lines with the last weighted line being stacked over the first weighted lines. The buoy connector and the pot connectors used in the second weighted line must be identifiable from the buoy connectors and pot connectors used with the first weighted line. In one embodiment, the buoy connector and the pot connectors attached to the second weighted line are attached to another pair of ring connectors. Optionally, the basket may be distributed with one or more weighted lines each with identifiable indicia printed on the buoy or pot connectors.

Also disclosed herein is a method for collecting and setting weighted lines that run between the buoy and a pot.

DESCRIPTION OF THE PREFERRED EMBODIMENT(S)

Figure 1:
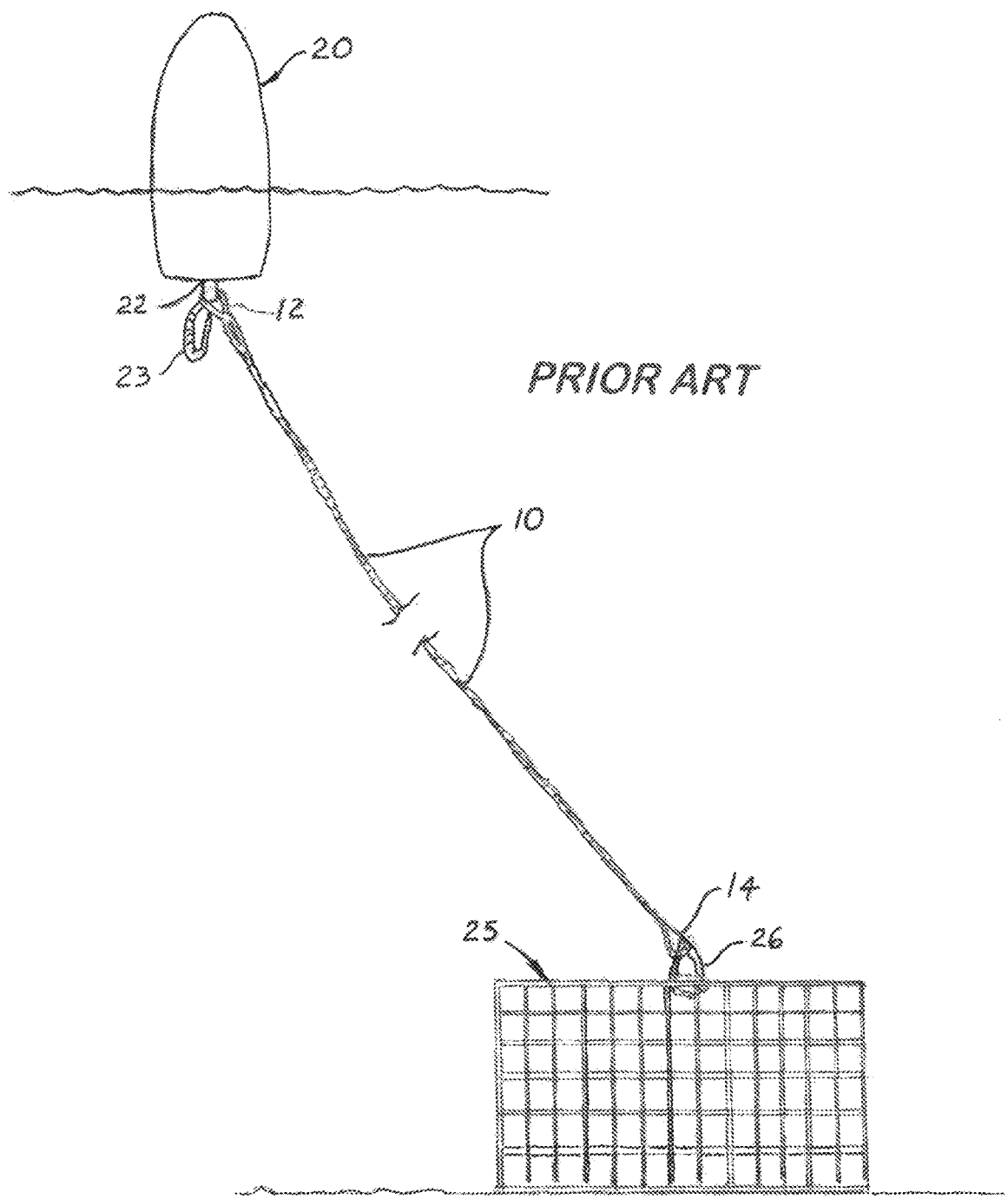
FIG. 1 is an illustration of a weighted line deployed between a floating buoy and a crab pot.

FIG. 1 is an illustration representing the prior art that shows a weighted line 10 deployed between a floating buoy 20 and a crab pot 25. Attached to one end of the weighted line 10 is a first manual connector, hereinafter called a buoy connector, 12 that attaches to an eyelet 22 or a buoy line 23. Attached to the opposite end of the weighted line 10 is a second manual connector, hereinafter called a pot connector, 14 that attaches either to a crab pot line 26 or to the crab pot 25.

Disclosed herein is a fishing line, wind-up basket 30 used to orderly collect one or multiple long, weighted lines 10 from a winch system 84 mounted on a davit 80 used to retrieve the weighted line 10.

Figure 2:
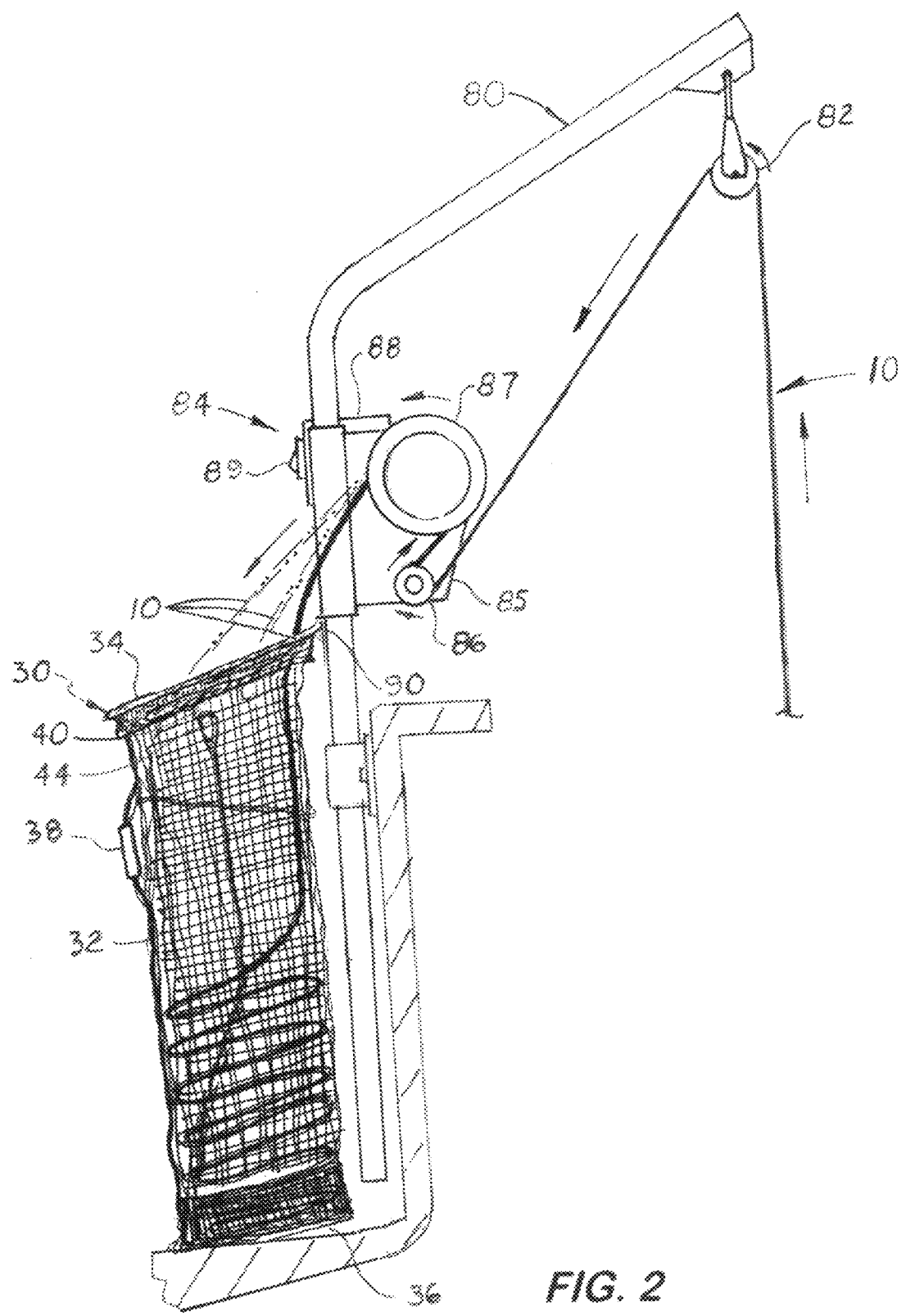
FIG. 2 is an illustration of the collection basket located below and adjacent to a davit mounted on the sideboard of a boat showing the weighted line being deposited in the basket.

As shown in FIG. 2, the winch system 84 includes a mounting plate 85 attached to the davit 80. Mounted on the mounting plate 85 is a lower pulley 86, and a main pulley 87. The upper pulley 82 is mounted on the upper end of the davit 80. The main pulley 87 is coupled to an electric motor 88. The electric motor 88 is connected to a switch 89 used to control the forward or reverse operations of the electric motor 88. During use, the winch system 84 is used to pull the crab pot 25 containing live catch upward and out of the water. When the crab pot 25 is lifted above the gunwale, the davit 80 is rotated to deposit the crab pot 25 on a designated landing area on the boat.

Figure 3:
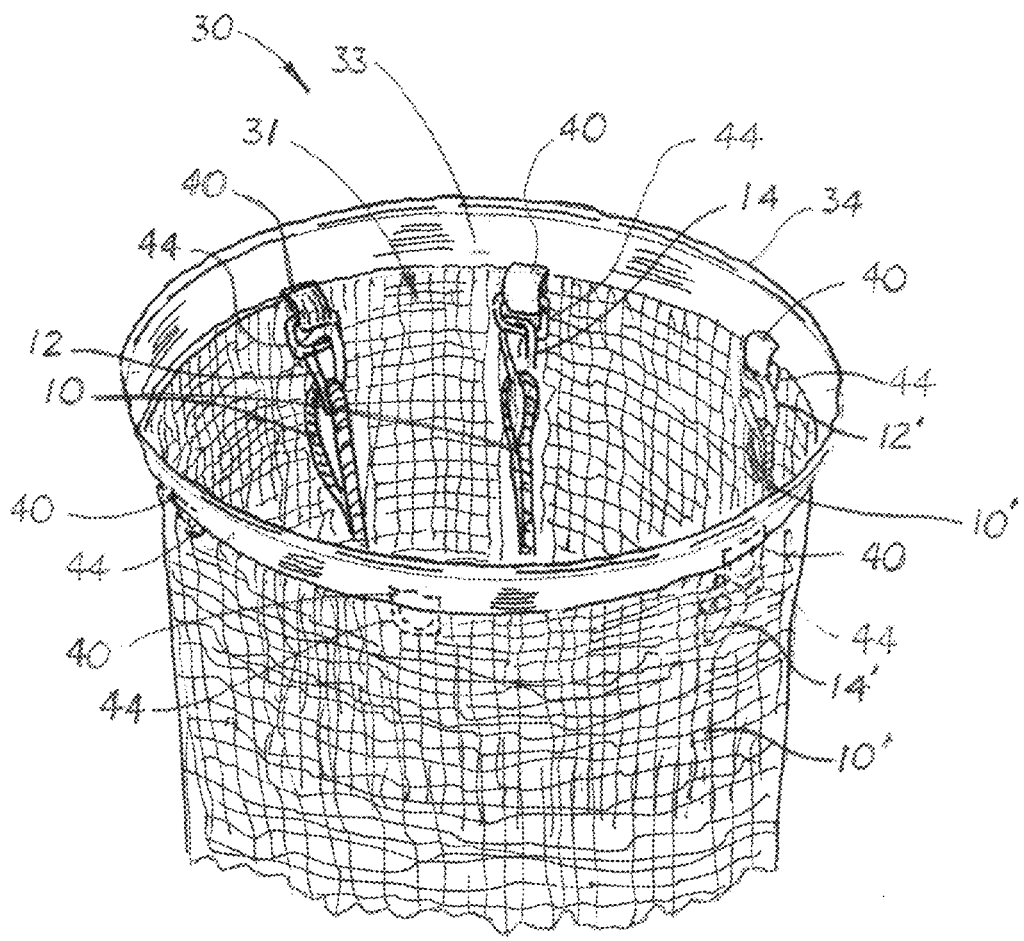
FIG. 3 is a partial, top perspective view of the collection basket.
Figure 4:
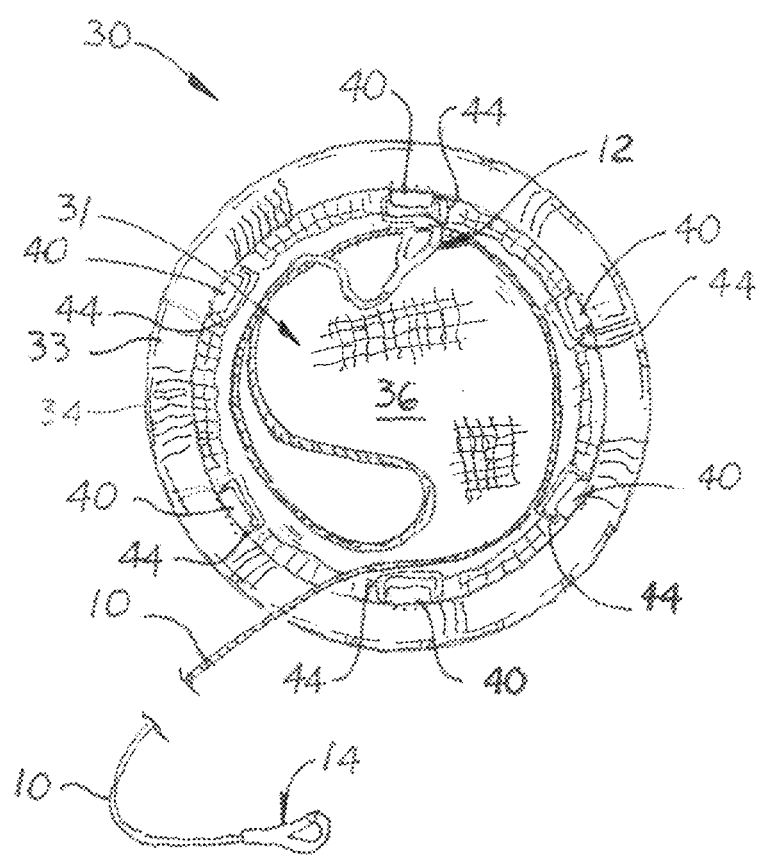
FIG. 4 is a top plan view of a basket showing the weighted line being deposited into the basket with the first manual connector attached to a ring connector.

As shown in FIGS. 2-4, basket 30 includes a reinforced upper ring 33 with a circular top edge 34 that forms and surrounds a top opening 31 into the basket 30. Basket 30 is a cylindrical structure with flexible sidewalls 32 that extend downward from the top edge 34 to a bottom panel 36. Attached to the inside surface of the reinforced upper ring 33 below the top edge 34 are at least two ring connectors 40. Attached to the side of the basket 30 is an optional handle 38.

Figure 5:
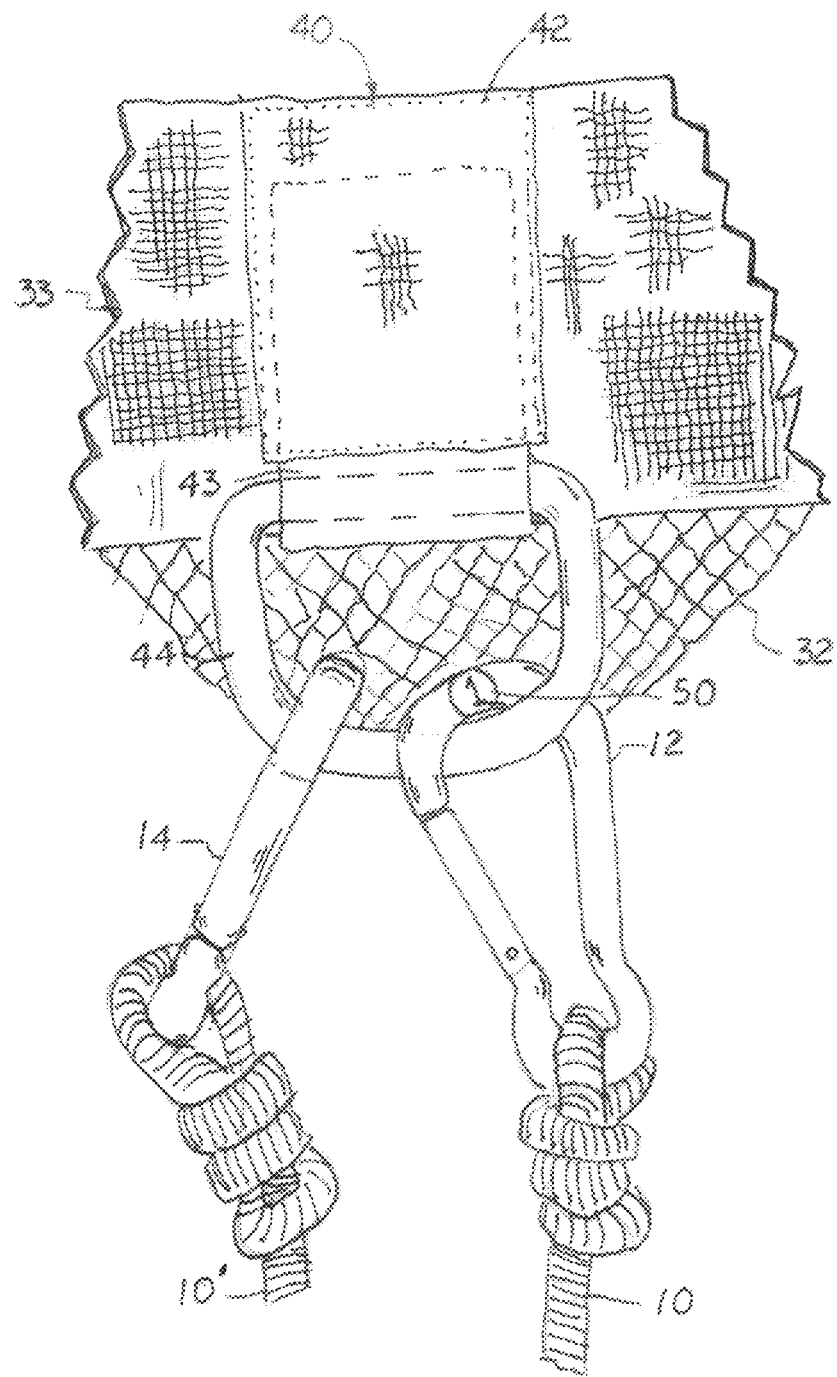
FIG. 5 is a partial side elevational view of the top edge of the basket showing the ring connector with buoy and pot connectors attached thereto.

In the embodiment shown in FIGS. 3 and 4, basket 30 includes six ring connectors 40 evenly spaced apart and attached to the inside surface of the reinforced upper ring 33. As shown in FIG. 5, each ring connector 40 includes a strap element 42 physically or adhesively attached to the inside surface of the reinforced upper ring 33. Attached to each strap element 42 is a tubular rigid support collar 43 in which a ring connector 44 extends.

Although FIGS. 3 and 4 show six ring connectors 40 evenly spaced apart along the reinforced upper ring 33, the number of ring connectors 40 may vary. During use, pot connector 14 is the last connector attached to a ring connector 44. Ideally, the user should connect the pot connector 14 to the crab pot 25 and the buoy connector 12 to the buoy 20 to prevent knots or entanglements in the weighted line 10 when the crab pot 25 is reset. This requires the user to track of which connector is the pot connector 14 and which connector is the buoy connector 12 for each weighted line.

FIG. 3 shows two weighted lines 10, 10' stored inside the basket 30. The buoy connector 12 and the pot connector 14 are attached to separate, adjacent ring connectors 40. The buoy connector 12' and pot connector 14' attached to the second weighted line, 10' are attached to a second pair of ring connectors 40.

It should be understood that the buoy connector 12 and the pot connector 14 may be attached to the same ring connector 40 as shown in FIG. 5. In this instance, unique identifying indicia 50 may be added to one or both connectors 12, 14 to help the user identify them.

Figure 6:
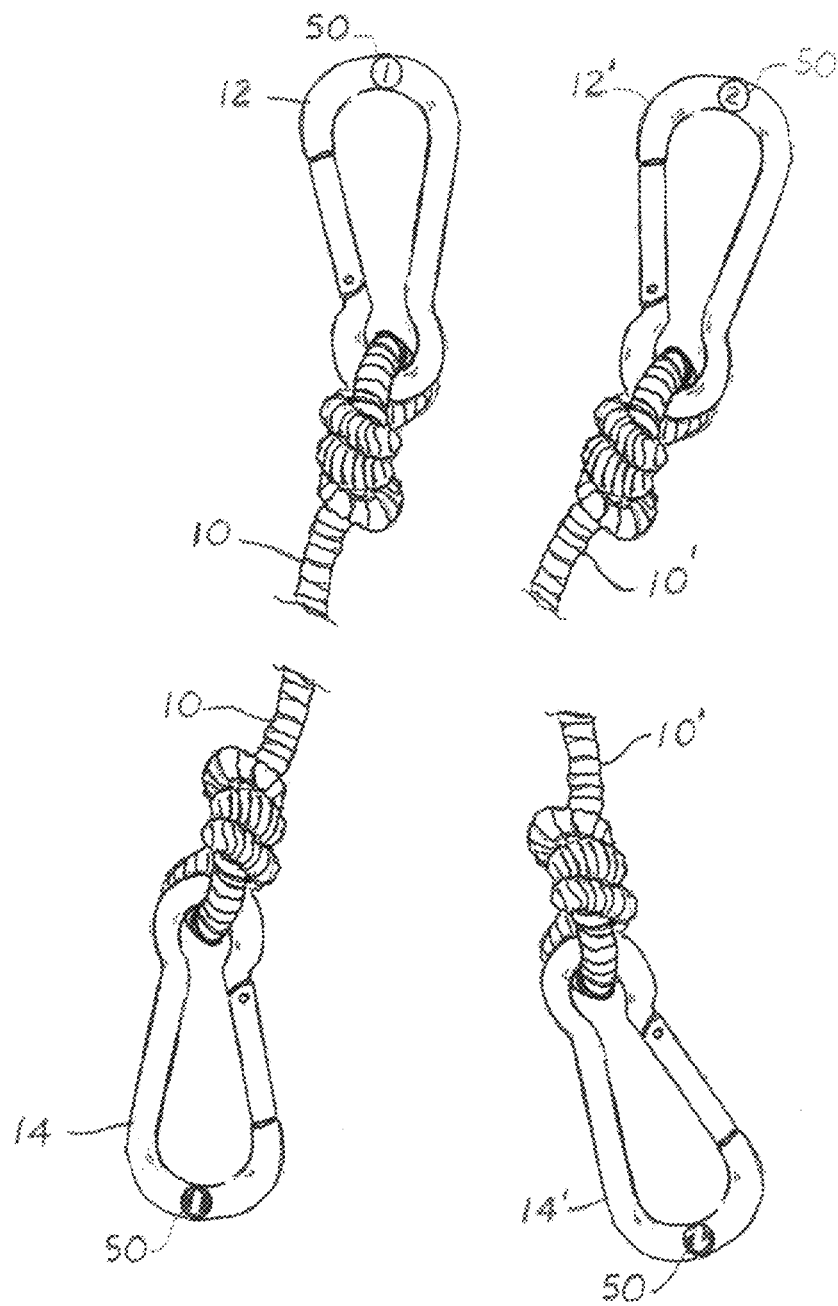
FIG. 6 is an illustration showing two weighted lines each with a pair of buoy and pot connectors attached at their opposite ends with unique identifiable indicia printed on each connector.

FIG. 6 is an illustration showing two weighted lines 10, 10' each with a pair of buoy and pot connectors 12, 14, and 12' 14, respectively, attached at their opposite ends with unique identifiable indicia 50 printed thereon.

During use, the weighted line 10 winds sequentially around the upper pulley 82, the lower pulley 86, and the main pulley 87. The buoy connector 12 is attached to a ring connector 44. As the weighted line 10 exits the winch system 84 and is forced into basket 30, the weighted line 10 settles on the bottom panel 36 and then bends against the inside surface of basket 30. Because the weighted line 10 is flexible and partially rigid and continuously forced downward into basket 30, the weighted line 10 is automatically wound in a stacked coil configuration inside basket 30.

The above basket 30 may be part of a weighted line storage system 9 that includes at least one weighted line 10 with a buoy connector 12 and a pot connector 14 attached at its opposite ends.

Also disclosed herein is a method for collecting and setting multiple weighted lines that run between buoys and crab pots.

The method includes first selecting the basket 30 described above, and attaching the basket 30 to a connector 90 located directly under the winch system 84. Next, buoy 20 is collected and buoy connector 12 is detached from the eyelet 22 formed on the bottom of buoy 20 or from a buoy line 23 attached to the eyelet 22. The segment of the weighted line 10 adjacent to the buoy connector 12 is then wound around upper, lower and main pulleys, 82, 86, and 87, respectively, as shown in FIG. 2. The buoy connector 12 is then attached to a ring connector 44 near the top edge 34 of the basket 30. The electric motor 88 is then activated which pulls the weighted line 10 and crab pot 25 towards the boat and out of the water. Because the weighted line 10 is weighted, the segment of the weighted line 10 falls directly into the bottom panel 36 in basket 30. The weighted line 10 is relatively flexible so that as the weighted line 10 is collected inside basket 30, the weighted line 10 is wound into a stacked vertical coil, as shown in FIG. 2.

When pot connector 14 reaches the upper pulley 82, the electric motor 88 is deactivated. The davit 80 is then rotated to deposit the crab pot 25 at a desired landing area on the boat. The pot connector 14 is then disconnected from crab pot line 26. The segment of the weighted line 10 is then forced into basket 30 and the pot connector 14 is attached to a ring connector 40.

When the crabber wants to reset crab pot 25, the potline connector 14 is detached from the ring connector 40 and attached to the crab pot line 26. The buoy connector 12 is detached from the ring connector 40 and attached to eyelet 22 or the buoy line 23. The entire coiled weighted line 10 is grabbed and removed from basket 30 and thrown into the water. Because the turns of the weighted line 10 are stacked and are not crossed, the opposite ends of the weighted line 10 separate without entanglements or knots.

In compliance with the statute, the invention described has been described in language more or less specific as to structural features. It should be understood, however, that the invention is not limited to the specific features shown since the means and construction shown comprises the preferred embodiments for putting the invention into effect. The invention is therefore claimed in its forms or modifications within the legitimate and valid scope of the amended claims, appropriately interpreted in accordance with the doctrine of equivalents.

We claim:

1. A multiple line connection and storage system, comprising:
   a. an elongated cylindrical basket with an inside surface, a top edge, flexible sidewalls, and a bottom panel, and at least two ring connectors mounted on said inside surface of said basket and adjacent to said top edge; and b. a plurality of weighted lines, each weighted line having a buoy connector attached at one end and a pot connector attached at an opposite end, said buoy connector configured to selectively attach to one of said ring connectors and said pot connector configure to selectively attach to the other of said ring connectors, wherein said buoy connector and said pot connector each includes a unique identifying indicia that enables a user to visually identify and distinguish one of the weighted lines from the other of the weighted lines.

2. A method for collecting a weighted line on a boat, the weighted line includes a buoy connector attached at one end of said weighted line that selectively attaches to a buoy and a pot connector attached to an opposite end of said weighted line that selectively attaches to a pot, said boat includes a winch system configured to pull said weighted line and pot from a body of water so that said pot may be deposited at a designated area on said boat, said method includes the following steps:

a. selecting an elongated cylindrical basket with an inside surface, a top edge, flexible sidewalls, and a bottom panel, and at least two ring connectors mounted on said inside surface of said basket and adjacent to said top edge;
  b. placing said basket below said winch system so that said weighted line may extend into said basket;
  c. grasping the buoy and detaching the buoy connector from said buoy and attaching said buoy connector to one said ring connector;
  d. winding a segment of said weighted line around said winch system;
  e. activating said winch system to pull said weighted line and said pot out of said water, directing a segment of said weighted line exiting said winch system into said basket to wind said weighted line into a coil inside said basket;
  f. deactivating said winch system when said pot is lifted out of said body of water;
  g. disconnecting said pot connector from said pot; and
  h. attaching said pot connector to one said ring connector.

* * * * *